3,574,708
BISPHENOL FORMATES
Keisuke Murayama, Syoji Morimura, and Hideo Horiuchi, Tokyo, Japan, assignors to Sankyo Company Limited, Tokyo, Japan
No Drawing. Filed Oct. 19, 1967, Ser. No. 676,621
Claims priority, application Japan, Oct. 27, 1966, 41/709,000
Int. Cl. C07c *69/06*
U.S. Cl. 260—479               5 Claims

ABSTRACT OF THE DISCLOSURE

Bisphenol formate derivatives which are useful as stabilizers against the photo- and/or thermal-deterioration of various polymers, such as polyolefins, polyacetals, polyurethanes and the like. These bisphenol formate derivatives are prepared by reaction of the corresponding bisphenol derivatives with a Vilsmeier reagent.

---

This invention relates to a new class of bisphenol formate derivatives and to a new process for the preparation thereof.

More particularly, it relates to the bisphenol formate derivatives having the formula $$H-\overset{O}{\underset{\|}{C}}-O-\underset{R_2}{\overset{R_1}{\bigcirc}}-X-\underset{R_2}{\overset{R_1}{\bigcirc}}-O-\overset{O}{\underset{\|}{C}}-H \quad (I)$$

wherein $R_1$ and $R_2$, which may be the same or different, represent hydrogen atom, an alkyl group containing from 1 to 5 carbon atoms or an alkoxy group containing from 1 to 5 carbon atoms, and X represents oxygen atom, sulfur atom, the group $$\underset{R}{\overset{-C-}{\diagup \diagdown}}\underset{R'}{}$$

(in which R and R', which may be the same or different, each represents hydrogen atom or an alkyl group containing from 1 to 4 carbon atoms or they may be joined together with the carbon atom to which they are attached to form a 5- or 6-membered saturated homocyclic ring) or the group

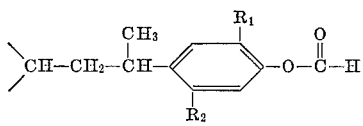

(in which $R_1$ and $R_2$ are as defined above). Also, it relates to a new process for the preparation of the above-mentioned bisphenol formate derivatives (I).

With regard to the groups in the above Formula (I), each of the $R_1$ and $R_2$ may be illustratively represented by those groups, i.e. methyl, ethyl, n-propyl, i-propyl, n-butyl, i-butyl, sec.-butyl, tert.-butyl, n-pentyl, methoxy, ethoxy, n-propoxy, i-propoxy, n-butoxy, i-butoxy, sec.-butoxy, tert.-butoxy and n-pentoxy, and the X may be illustratively represented by those groups; —O—, —S—, —CH₂—,

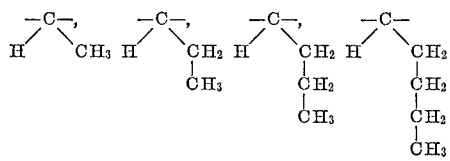

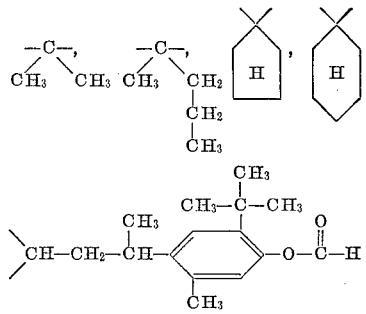

The new bisphenol formate derivatives having the above Formula (I) are novel compounds unknown in the prior art. They are useful as stabilizers against the photo- and/or thermal-deterioration of resinous polymers such as, for example, polyolefins, polyurethanes, polyacetals and the like.

Although some bisphenol derivatives analogous to the present bisphenol formate derivatives (I) are known and proposed as stabilizers suitable for the stabilization of photo- and/or thermal-deterioration of resinous polymers, the present bisphenol formate derivatives (I) have been found to exhibit much higher stabilizing activities against such deterioration, as compared with the known bisphenol stabilizers.

When the new bisphenol formate derivatives having the above Formula (I) are to be employed in the resinous polymer for the purpose of stabilization, they may be readily incorporated into the resinous polymer by various standard procedures commonly utilized in the art. The stabilizer of this invention may be incorporated into the resinous polymer at any desired stage prior to the manufacture of shaped articles. For example, the dry stabilizer in a form of powder may be admixed with the resinous polymer or a suspension or emulsion of the resinous polymer may be admixed with a suspension or emulsion of the stabilizer of this invention.

The amount of the bisphenol formate derivatives to be employed in the resinous polymer in accordance with this invention may be widely varied, depending upon the types, properties and particular uses of the resinous polymer and other factors. For instance, where polyolefin is to be stabilized against photo-deterioration, the stabilizer of this invention is usually and preferably employed in the range of concentrations of about 0.01–2.0% by weight and more preferably of about 0.05–2.0% by weight, these concentrations being based upon the weight of the polyolefin employed. Where polyurethane is to be stabilized against photo-deterioration, the stabilizer of this invention is usually and preferably employed in the range of concentration of about 0.01–10% by weight and more preferably of about 0.05–5% by weight, these concentrations being based upon the weight of the polyurethane employed. Where polyacetal is to be thermally stabilized, the stabilizer of this invention is usually and preferably employed in the range of concentrations of about 0.05–10% by weight and more preferably of about 0.1–5% by weight, these concentrations being based upon the weight of the polyacetal employed.

The bisphenol formate derivatives (I) of this invention may be optionally and advantageously employed alone or in combination with other additives, such as other known stabilizers (including, for example, antioxidants and ultraviolet absorbents), fillers, pigments and the like. If necessary, an optional combination of two or more bisphenol formate derivatives (I) may be satisfactorily employed in this invention to obtain the better results.

It is, accordingly, a principal object of this invention to provide a new class of the bisphenol formate derivatives having the above Formula (I) which are useful as stabilizers against photo- and/or thermal-deterioration of resinous polymers.

Another object of this invention is to provide a new process for the preparation of the valuable bisphenol formate derivatives having the above Formula (I).

These and other objects of this invention will become apparent from the detailed description which follows.

According to this invention, there is provided a new process for the preparation of the bisphenol formate derivative having the above Formula (I) which comprises reacting a bisphenol derivative having the formula

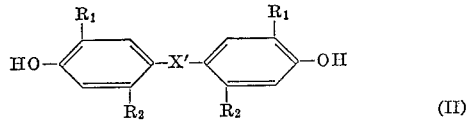

(II)

wherein $R_1$ and $R_2$ are as defined above and $X'$ represents oxygen atom, sulfur atom, the group

(in which R and R' are as defined above) or the group

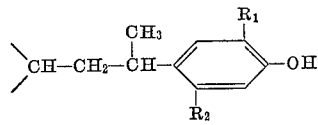

(in which $R_1$ and $R_2$ are as defined above) with a Vilsmeier reagent, the said reagent being composed of a formamide derivative and a chloride selected from the group consisting of phosphorus oxychloride, phosphorus pentachloride, phosgene, thionyl chloride and sulfuryl chloride.

The reaction in the present process which is unknown in the prior art would be believed to be classified as a variation of "Vilsmeier reaction."

There may be employed any combination of a formamide derivative and the chloride as set forth hereinabove. Suitable examples of the formamide derivatives to be employed in the present process include monoalkylformamides such as N-methylformamide, dialkylformamides such as dimethylformamide, diethylformamide, alkylarylformamide such as N-methylformanilide and the like, but dimethylformamide is most preferable. Any other solvent is not required in the present process, since the said formamide derivative will act as both a reagent and a reaction solvent, when employed in an excess over a stoichiometric amount, but, if desired, there may be additionally and satisfactorily employed other organic solvents inert to the reaction in the present process, such as benzene, toluene, xylenes, O-dichlorobenzene and the like. The reaction temperature is generally in the range of about 70–120° C. The reaction period will be dependent upon mainly the kind and amount of starting material employed as well as the reaction temperature applied, but the reaction is usually completed in approximately 5–30 hours.

One of the preferred embodiments in practicing the present process comprises adding to the said formamide derivative such as dimethylformamide a suitable amount of the said chloride such as phosphorus oxychloride with ice-cooling, adding to the resulting solution the said starting materials (II) under the same condition as above and stirring the mixture at about 95–110° C. for about 10–24 hours.

After completion of the reaction, the reaction product may be easily recovered and purified by a conventional means. For instance, the reaction mixture may be poured onto ice and the mixture is extracted with a suitable water-immiscible organic solvent, for example, benzene, after neutralization with a suitable weakly basic substance, for example, sodium carbonate. The extract is dried and the solvent is distilled off to obtain the desired product which may be then purified by recrystallization from a suitable organic solvent, for example, methanol or by distillation in vacuo.

The following examples serve to illustrate this invention in further detail, but they are not intended to be limiting the scope thereof.

EXAMPLE 1

Preparation of 2,2'-dimethyl-4,4'-diformyloxy-5,5'-di-tert.-butyldiphenylsulfide To 100 ml. of dimethylformamide was added dropwise with stirring and ice-cooling 50 g. of phosphorus oxychloride. The resulting mixture was stirred at room temperature for 1 hour. To the mixture was added 30 g. of 2,2' - dimethyl-4,4'-dihydroxy-5,5'-di-tert.-butyl diphenylsulfide. The resulting mixture was gradually heated to 100–105° C. and then stirred at that temperature for 24 hours. After completion of the reaction, the reaction mixture was poured onto cracked ice and, after neutralization by the addition of sodium carbonate, the whole mixture was extracted several times with benzene. The combined extracts were washed successively with aqueous sodium bicarbonate and water, dried over anhydrous sodium sulfate and the benzene was distilled off. The residue was recrystallized from ethanol to yield the desired product melting at 90–91° C.

*Analysis.*—Calculated for $C_{24}H_{30}O_4S$: C, 69.54; H, 7.30. Found: C, 69.66; H, 7.37.

IR spectrum (Nujol) [1]
1756 cm.$^{-1}$ (ester, $\gamma_{c=o}$),
1170 cm.$^{-1}$ (formic acid ester, $\gamma_{c-o}$).

[1] Two absorption bands (3320 cm.$^{-1}$ and 3495 cm.$^{-1}$) disappeared which were based upon the presence of hydroxyl group in the starting material.

EXAMPLE 2

Preparation of 1,1-bis(2-methyl-4-formyloxy-5-tert.-butylphenyl)butane

The same procedure as in the above Example 1 was repeated except that 60 g. of N-methylformanilide, 15 g. of phosphorus oxychloride and 10 g. of 1,1-bis(2-methyl-4-hydroxy-5-tert.-butylphenyl)butane were employed as reactants and the reaction was conducted at 95–105° C. for 10 hours. After completion of the reaction, the reaction mixture was treated in the same manner as in the above Example 1 and the resulting crystalline substance was recrystallized from benzene to yield the desired product melting at 110–111° C.

*Analysis.*—Calculated for $C_{28}H_{38}O_4$: C, 76.67; H, 8.73. Found: C, 76.87; H, 8.75.

IR spectrum (Nujol) [1]
1749 cm.$^{-1}$ (ester, $\gamma_{c=o}$),
1172 cm.$^{-1}$ (formic acid ester, $\gamma_{c-o}$).

[1] The absorption band (3480 cm.$^{-1}$) disappeared which was based upon the presence of hydroxyl group in the starting material.

EXAMPLE 3

Preparation of 2,2-bis(4-formyloxyphenyl)propane

The same procedure as in the above Example 2 was repeated except that 40 ml. of dimethylformamide, 17 g. of thionyl chloride and 10 g. of 2,2-bis(4-hydroxyphenyl)propane were employed as reactants. After completion of the reaction, the reaction mixture was treated in the same manner as in Example 2 and the resulting oily substance was recrystallized from ethanol to yield the desired product melting at 95–96° C.

*Analysis.*—Calculated for $C_{17}H_{16}O_4$: C, 71.82; H, 5.67. Found: C, 71.86; H, 5.54.

IR spectrum (Nujol) [1]
1745 cm.$^{-1}$ (ester, $\gamma_{c=o}$),
1190 cm.$^{-1}$ (formic acid ester, $\gamma_{c-o}$).

[1] The absorption band (3340 cm.$^{-1}$) disappeared which was based upon the presence of hydroxyl group in the starting material.

EXAMPLE 4

Preparation of 1,1,3-tris(2-methyl-4-formyloxy-5-tert.-butylphenyl)butane

The same procedure as in the above Example 2 was repeated except that 30 ml. of dimethylformamide, 9.5 g. of phosgene and 10 g. of 1,1,3-tris(2-methyl-4-hydroxy-5-tert.-butylphenyl) butane were employed as reactants. After completion of the reaction, the reaction mixture was treated in the same manner as in the above Example 2 and the resulting oily substance was recrystallized from ethanol to yield the desired product melting at 153.5–154.5° C.

*Analysis.*—Calculated for $C_{40}H_{52}O_6$: C, 76.40; H, 8.34. Found: C, 76.12; H, 8.35.

IR spectrum (Nujol) [1]
1743 cm.$^{-1}$ (ester, $\gamma_{c=o}$),
1175 cm.$^{-1}$ (formic acid ester, $\gamma_{c-o}$).

[1] The absorption band (3500 cm.$^{-1}$) disappeared which was based upon the presence of hydroxyl group in the starting material.

Similarly, there were obtained the following bisphenol formates:
2,2-di-tert.-butyl-4,4'-diformyloxy-5,5'-dimethoxydiphenylmethane;
1,1-bis(3-methyl-4-formyloxyphenyl)cyclohexane, and
4,4-diformyloxydiphenyl ether.

What is claimed is:
1. A compound having the formula

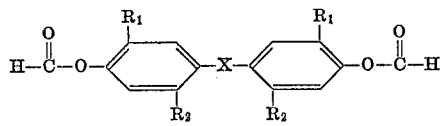

wherein $R_1$ and $R_2$, which may be the same or different, represent hydrogen atom, an alkyl group containing from 1 to 5 carbon atoms or an alkoxy group containing from 1 to 5 carbon atoms, and X represents oxygen atom, sulfur atom, the group

(in which R and R', which may be the same or different, each represents hydrogen atom or an alkyl group containing from 1 to 4 carbon atoms or they may be joined together with the carbon atom to which they are attached to form a 5- or 6-membered saturated homocyclic ring) or the group

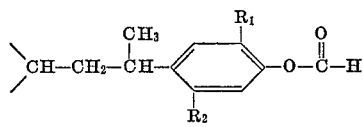

(in which $R_1$ and $R_2$ are as defined above).

2. 2,2'-dimethyl - 4,4' - diformyloxy-5,5' -di-tert.-butyl diphenyl sulfide.

3. 1,1 - bis(2 - methyl - 4 - formyloxy-5-tert.-butylphenyl) butane.

4. 2,2-bis(4-formyloxyphenyl)propane.

5. 1,1,3 - tris(2 - methyl - 4-formyloxy-5-tert.-butylphenyl) butane.

References Cited
UNITED STATES PATENTS

| | | | |
|---|---|---|---|
| 2,486,580 | 11/1949 | Tallman et al. | 260—479 |
| 3,437,633 | 4/1969 | Murayama | 260—479 |

JAMES A. PATTEN, Primary Examiner

U.S. Cl. X.R.

260—45.85